United States Patent [19]

Horikawa et al.

[11] Patent Number: 5,145,539
[45] Date of Patent: Sep. 8, 1992

[54] METHOD OF PRODUCING A HONEYCOMB STRUCTURAL BODY HAVING AT LEAST ONE STEP PROTRUDED FROM OR RECESSED IN AT LEAST ONE PORTION OF AN OUTER CIRCUMFERENTIAL SURFACE THEREOF

[75] Inventors: Osamu Horikawa, Toyoake; Koichi Ikeshima, Okazaki, both of Japan

[73] Assignee: NGK Insulators, Inc., Japan

[21] Appl. No.: 760,146

[22] Filed: Sep. 16, 1991

Related U.S. Application Data

[62] Division of Ser. No. 406,048, Sep. 12, 1989, Pat. No. 5,080,953.

[30] Foreign Application Priority Data

Sep. 22, 1988 [JP] Japan ................ 63-236595

[51] Int. Cl.$^5$ ............................................. B32B 31/16
[52] U.S. Cl. .................................. 156/89; 29/890; 51/310; 51/319; 51/326; 51/410; 156/153; 428/116; 428/188
[58] Field of Search .............. 156/89, 153; 29/428, 29/527.3, 530, 890; 422/177; 51/310, 319, 326, 410, DIG. 14; 428/116, 188

[56] References Cited

U.S. PATENT DOCUMENTS

| | | |
|---|---|---|
| 3,887,741 | 6/1975 | Dwyer . |
| 3,938,232 | 2/1976 | Noda et al. ............... 156/89 |
| 3,941,157 | 3/1976 | Barnett . |
| 3,983,283 | 9/1976 | Bagley . |
| 4,007,539 | 2/1977 | Nishio .................... 29/890 |
| 4,144,627 | 3/1979 | Noda et al. .............. 29/890 |
| 4,269,807 | 5/1981 | Bailey et al. ............. 29/890 |
| 4,347,219 | 8/1982 | Noritake et al. .......... 29/890 |
| 4,451,517 | 5/1984 | Inoguchi et al. . |
| 4,619,912 | 10/1986 | Jalbing et al. . |
| 4,795,615 | 1/1989 | Cyron et al. ............. 29/890 |
| 4,869,944 | 9/1989 | Harada et al. . |
| 4,985,212 | 1/1991 | Kawakami et al. ........ 29/890 |
| 4,988,483 | 1/1991 | Usui et al. . |

FOREIGN PATENT DOCUMENTS

| | | |
|---|---|---|
| 0217493 | 8/1987 | European Pat. Off. . |
| 0283224 | 9/1988 | European Pat. Off. . |
| 2312794 | 9/1974 | Fed. Rep. of Germany . |
| 3428102 | 2/1986 | Fed. Rep. of Germany . |
| 62-179319 | 11/1987 | Japan . |
| 2005573 | 4/1979 | United Kingdom .......... 51/310 |

Primary Examiner—Caleb Weston
Attorney, Agent, or Firm—Parkhurst, Wendel & Rossi

[57] ABSTRACT

A ceramic honeycomb structural body for catalytic converters and filters for removing fine particles can be provided which is secured firmly in the catalytic converters with high reliability, minimum volume and small strength to external pressure without displacements and breakage thereof and a loss of expensive noble metals, by forming at least one step on the outer circumferential surface of the honeycomb structural body so as to form at least one recessed portion or protruded portion on the outer circumferential surface; the recessed portion or the protruded portion has a rough surface or is formed discontinuously to afford firm and safe holding of the ceramic honeycomb structural body in the vessel of the catalytic converter via a sealing member and/or a cushioning member.

9 Claims, 4 Drawing Sheets

FIG._1a
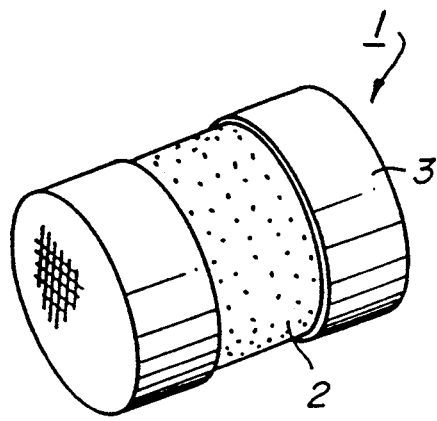
FIG._1b
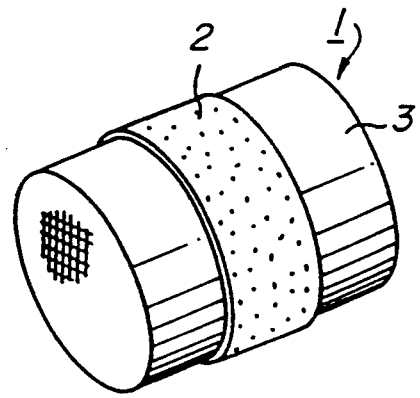
FIG._1c
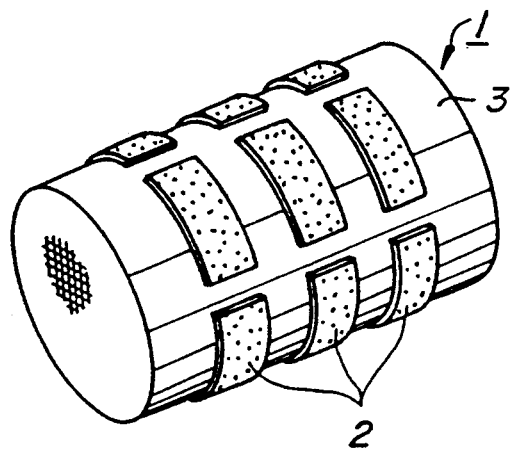
FIG._2
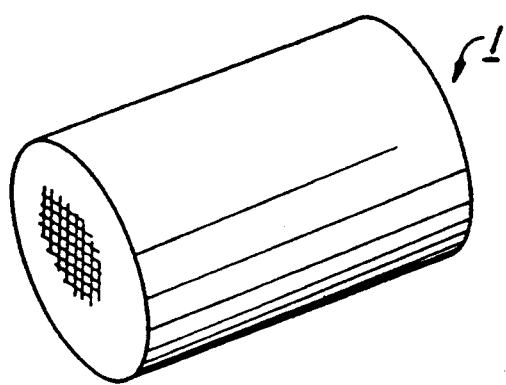

FIG_3d
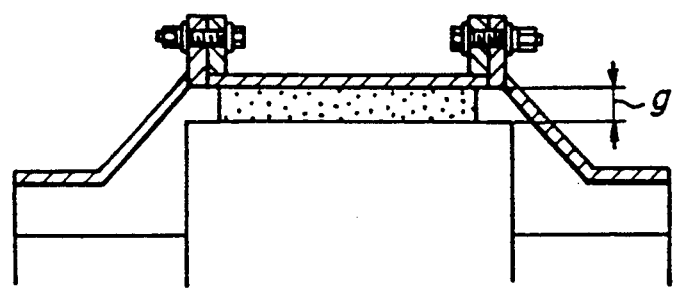
Fig_3e
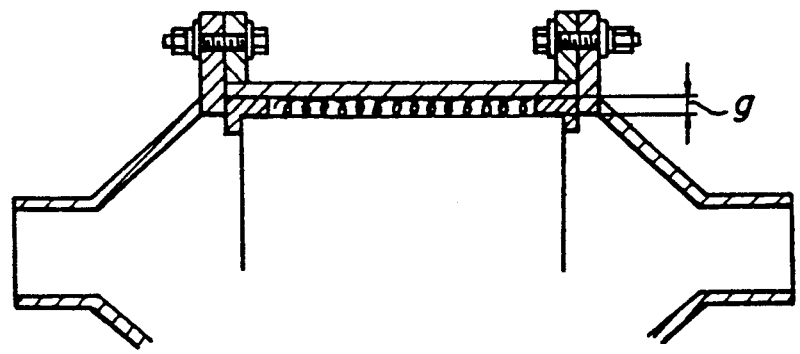

METHOD OF PRODUCING A HONEYCOMB STRUCTURAL BODY HAVING AT LEAST ONE STEP PROTRUDED FROM OR RECESSED IN AT LEAST ONE PORTION OF AN OUTER CIRCUMFERENTIAL SURFACE THEREOF

This is a division of application Ser. No. 07/406,048 filed Sept. 12, 1989, now U.S. Pat. No. 5,080,953, granted Jan. 14, 1992.

BACKGROUND OF THE INVENTION

1. Field of the Invention

This is a Rule 60 Divisional application of Ser. No. 07/406,048 filed Sept. 12, 1989.

The present invention relates to a honeycomb structural body, more particularly a honeycomb structural body to be used as a filter for removing fine particles, a substrate for catalysts in a catalytic converter for purifying exhaust gases emitted an internal combustion engine, or a substrate for catalysts in a catalytic converter for purifying and/or deodorizing burnt gases of petroleum oils, and a method of producing the same.

2. Related Art Statement

Heretofore, in order to withstand violent vibrations during use, catalytic converters which are mounted on automobiles include generally, as shown in FIG. 4, a supporting system wherein a honeycomb structural body is supported not only by supporting members 12-1, 12-2 (to be referred to as "cushioning member", hereinafter) having a cushioning property in a direction orthogonal (to be referred to as "radial direction", hereinafter) to a direction of throughholes 11-1, 11-2 through which an exhaust gas is flowed, but also by positioning and supporting plates 13-1, 13-2 directly or via a cushioning member 12-1 in the direction of the throughholes. However, in such a supporting system, the throughholes 11-2 of the honeycomb structural body are abutted and closed by a portion of the cushioning member 12-1, so that the closed throughholes of the honeycomb structural body are vainly left unused. Therefore, in order to save expensive noble metals of the catalyst at such unused throughholes, a supporting system using only a sealing member 14 as shown in FIG. 5, having a cushioning or buffering property (to be referred to as "sealing-member", hereinafter), such as a ceramic mat, etc., around the whole side surface or circumferential surface of the honeycomb structural body, and supporting the honeycomb structural body solely in radial directions by the sealing member 14 is also practiced in the field of the art.

Also, a supporting system is known, as disclosed in Japanese Utility Model Application Laid-open No. 62-179,319, wherein, in order to prevent scattering of the sealing member, a barrier is formed on the outer circumferential surface of the ceramic honeycomb structural body at a location adjacent to at least one end surface of the sealing member.

The above described practiced system of supporting the honeycomb structural body only in radial directions thereof has to exert a high pressure on the honeycomb structural body in radial directions, in order to prevent displacement of the honeycomb structural body in the supporting system of catalytic converters due to violent vibrations during use. Therefore, the supporting system can support the honeycomb structural body in radial directions thereof, only when the honeycomb structural body has so relatively thick partition walls of, for example, 0.3 mm in thickness so that it can exhibit a high strength to withstand an exerted high exterior supporting pressure. However, the supporting system has a drawback in that it can not be practiced, if the honeycomb structural body has relatively thin partition walls of, for example, 0.15–0.20 mm in thickness so, that it has an insufficient low strength to withstand an exerted high exterior supporting pressure.

Also, the technique of Japanese Patent Application Laid-open No. 62-179,319 has a drawback in that it is wholly useless in preventing a displacement of the honeycomb structural body in circumferential directions, namely, a rotation thereof.

SUMMARY OF THE INVENTION

An object of the present invention is to obviate the above problems and drawbacks.

Another object of the present invention is to provide a honeycomb structural body which prevents not only displacement thereof in the throughholes direction, but also displacement thereof in the circumferential direction so as to enable a secure support and holding thereof.

A further object of the present invention is to provide a method of producing such a honeycomb structural body.

Now, the above objects can be achieved by the present invention.

The present invention is a ceramic honeycomb structural body for catalytic converters and filters for removing fine particles, having a number of throughholes and partition walls defining the throughholes, comprising at least one step protruded or recessed from at least one portion of the outer circumferential surface of the honeycomb structural body. The step has a surface which more is rough than the other portion of the outer circumferential surface of the honeycomb structure or is formed discontinuously.

In another aspect, the present invention is a method of producing the ceramic honeycomb structural body for catalytic converters and filters, wherein at least one step is formed on at least one portion of the outer circumferential surface of the ceramic honeycomb structural body by providing at least one recessed portion by sandblasting the at least one portion of the outer circumferential surface, or providing at least one protruded portion or protrusion by masking the portions of the outer circumferential surface not requiring the protrusion, spraying optionally ceramic particles or ceramic raw materials particles on the at least one portion, spraying a slip of ceramic raw materials which may contain ceramic particles on the at least one portion, drying the sprayed slip on the honeycomb structural body, and sintering the dried slip on the honeycomb structural body.

In the above arrangements, if sandblasting is effected at the outer circumferential surface of the ceramic honeycomb structural body, the sandblasted portion is ground roughly to form at least one recessed portion. As a result, if the obtained ceramic honeycomb structural body is assembled to a converter in a vessel together with a sealing member and/or a cushioning member, the sealing member and/or the cushioning member bites the recessed portion of the honeycomb structural body, so that the honeycomb structural body is supported firmly by the sealing member and/or the cushioning member. Therefore, displacement of the honeycomb structural body in the direction of the throughholes and the rotational displacement of the honeycomb structural body in the circumferential direction thereof can be effectively prevented, even when the honeycomb structural body is supported solely from the radial direction thereof. Honeycomb structural bodies having the protruded portion formed by masking, spraying a slip of ceramic raw materials which may contain ceramic particles, optionally spraying ceramic particles, drying, and sintering, can also be firmly secured.

If the honeycomb structural body has a smooth circumferential surface or the recessed portions or the protruded portions of the honeycomb structural body exist continuously on the smooth circumferential surface, the unpreferable displacements of the honeycomb structural body are liable to occur. Meanwhile, if the recessed portions or the protruded portions of the honeycomb structural body exist discontinuously on the circumferential surface, the sealing member and/or the cushioning member inserted between the vessel of the catalytic converter and the honeycomb structural body bites on the steps, so that the honeycomb structural body is satisfactorily held firmly in the vessel via the sealing member and/or the cushioning member with a low exterior supporting pressure exerted thereon.

Because the honeycomb structural body can be supported merely in radial direction as described above, the catalyst supported on the partition walls of the throughholes of the honeycomb structural body and which is not used by the closure of the throughholes by the abuttment of the cushioning member on the throughholes can be dispensed with, so that the vain loss of unused noble metals can be eliminated, and the volume of the catalyst honeycomb structural body can be decreased, so that the volume of the vessel of the catalyst converter housing and supporting the catalyst honeycomb structural body can be decreased.

BRIEF DESCRIPTION OF THE DRAWINGS

For a better understanding of the present invention, reference is made to the accompanying drawings, in which:

FIGS. 1a, 1b, and 1c are schematic perspective views of a few examples-of the honeycomb structural body of the present invention, showing the structures thereof;

FIG. 2 is a schematic perspective view of a referential honeycomb structural body used in the Examples, showing the structure thereof;

FIGS. 3b, 3c, 3d, and 3e are schematic cross-sectional views of catalytic converters used for testing the honeycomb structural bodies used in the Example, showing the structures thereof.

Figure 3A:
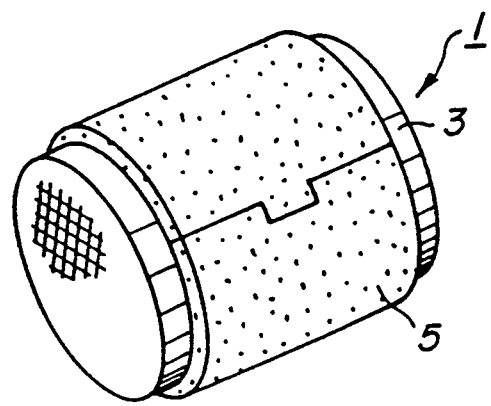
FIG. 3a is a schematic perspective view of an example of the honeycomb structural body of the present invention used in the Example which is wrapped by a sealing member, showing the structure thereof.

Numbering in the drawings.
1 ... honeycomb structural body
2 ... worked or processed portion
3 ... outer wall surface
4 ... vessel of catalytic converter
5 ... ceramic mat
g ... gap between the vessel and the honeycomb structural body.

DESCRIPTION OF THE PREFERRED EMBODIMENTS

Referring to FIG. 1a, an embodiment of the honeycomb structural body of the present invention obtained by sandblasting is shown in perspective view. In this embodiment, a compressed air containing particles of a grinding agent is blown on a circular portion of the circumferential surface of the honeycomb structural body 1 to grind the portion so as to form a ground roughened circular portion or worked portion 2 on the circumferential surface.

In order to obtain the honeycomb structural body of this embodiment, at first a batch of raw materials of a desired composition is extruded into the honeycomb structure body 1, then dried and sintered to obtain a sintered body. Then, the sintered body is covered by a mask except the desired circular portion of the circumferential surface thereof, and a compressed air containing fine particles of a grinding agent is blown thereon to form a ground roughened circular portion on the honeycomb structural body. Finally, the mask is removed to obtain the honeycomb structural body 1 having a roughened and stepped surface.

In this case, the outer wall of the circumferential surface of the honeycomb structural body is ground to a small thickness, so that preferably the honeycomb structural body is extruded to have an outer wall which is thicker that of the ground circumferential surface so as to preliminarily compensate the thickness of the outer wall to be ground.

Preferably, the grinding agent has a fineness of mesh #20-400, and the compression air has a pressure of 2-5 kg/cm$^2$.

If an organic matter, such as a paste, etc., is sprayed discontinuously in a spot-like fashion on the circumferential surface before performing the sand-blasting, non-sprayed portion allow a faster grinding speed, and permit a larger surface roughness than the sprayed portion at the time of sand blasting.

Referring to FIG. 1b, an embodiment of the honeycomb structural body of the present invention which has ceramic particles formed or adhered on the circumferential surface, is shown in perspective view. In this embodiment, a worked portion 2 having formed ceramic particles is provided circularly on the central portion of the circumferential surface of the honeycomb structural body I.

In order to obtain the honeycomb structural body of this embodiment, at first a batch of raw materials of a desired composition is extruded into the honeycomb structural body 1, and dried to obtain a dried body. Then, a batch of raw materials of the same composition as the extruded batch is added with water, a binder, etc., to form a slip of an adhesive. Pulverized and graded ceramic particles or granulated particles of the same composition are incorporated and agitated thoroughly in the slip, and the slip is applied, sprayed or transcribed on a desired portion of the dried body after masking. Thereafter, the drying, and the sintering, are effected in the same manner as in the embodiment of FIG. 1a, to obtain the honeycomb structural body having the ceramic particles formed on the desired portion of the circumferential surface. The masking was effected on a non-desired portion in the same manner as in the embodiment of FIG. 1a so as not to form ceramic particles on the non-desired portion.

Preferably, the adhesive and the ceramic particles have the same composition as that of the batch of the honeycomb structural body. However, any adhesive and ceramic particles having a different composition from that of the batch of the honeycomb structural body can be used, so far as the adhesive and the ceramic particles do not form an adverse reaction product at the sintering temperature and have a substantially the same thermal expansion coefficient as that of the composition of the batch of the honeycomb structural body. If granulates of a batch of raw materials are used as ceramic particles, a solvent and a binder for granulating the batch should be selected so that they do not dissolve in the adhesive when they are incorporated in the adhesive.

Alternatively, the honeycomb structural body of the present invention can also be obtained by a method of applying an adhesive which does not contain ceramic particles or granulated particles of a batch of a composition the same as that of the honeycomb structural body on a desired portion of the circumferential surface of the honeycomb structural body, subsequently causing the ceramic particles or the granulates of the batch to adhere to the adhesive by spray, etc., drying, and sintering. In this case, if the ceramic particles or the granulates of the batch are applied in advance with an adhesive and dried for such use, the ceramic particles or the granulates are advantageously adhered on the honeycomb structural body completely.

Referring to FIG. 1c, an embodiment of the honeycomb structural body of the present invention which has ceramic particles discontinuously formed on the circumferential surface is shown in perspective view. In this embodiment, worked portion 2 is formed on portions of the circumferential surface of the honeycomb structural body 1, wherein ceramic particles are discontinuously formed in the direction of throughholes and in the circumferential direction which is at a right angle to the throughholes.

The honeycomb structural body of this embodiment can be produced in the same manner as described for the above FIG. 1b.

The honeycomb structural body of the present invention includes also a honeycomb structural body on which a slip of adhesive is applied or sprayed on a desired portion of the circumferential surface to a desired thickness to form a ceramic layer. A honeycomb structural body can be obtained in the same manner as described for the above FIG. 1b, except that the ceramic particles or the granulates of the batch are not sprayed, applied or transcribed.

Hereinafter, the present invention will be explained in more detail with reference to the following Examples.

EXAMPLES 1-8 AND REFERENTIAL EXAMPLES 1-3

Honeycomb structural bodies of Examples 1-8 and Referential Examples 1-3 are prepared in the following ways.

The honeycomb structural bodies of Examples 1-8 and Referential Examples 1-3 have a density of throughholes of 46.5 cells/cm$^2$, a length of 100 mm, a partition wall thickness of 0.20 mm, and an outer wall thickness of the circumferential surface of 0.3 mm, unless otherwise specified.

EXAMPLE 1

A batch of raw materials which forms cordierite when sintered (to be referred to as "cordierite material", hereinafter) is formed by extrusion, as shown in FIG. 1a, and sintered to obtain a honeycomb structural body having an outer diameter of 100 mm, and an outer wall thickness of the circumferential surface of about 0.7 mm. Both end portions of the circumferential surface of the honeycomb structural body within 25 mm from the respective end are covered by masks, and the remaining unmasked central portion of the circumferential surface of a length of 50 mm is blown by a compressed air containing fine particles of a grinding agent. The central portion is blown circularly twice each for about 1 min to yield an outer diameter of 99 mm, and a surface roughness of about 100 μm as an average of ten measurements, as shown in FIG. 1a.

In this case, the grinding agent was an electrofused alumina of #60, and the compressed air had a pressure of 3 kg/cm$^2$.

EXAMPLE 2

The procedures of Example 1 are repeated using the same materials as in Example 1, except that the central portion is blown circularly once for about 1 min to yield an outer diameter of 99.5 mm.

EXAMPLE 3

The cordierite material is formed by extrusion, sintered, masked at both ends, sprayed wholly on the non-masked central portion of a length of 50 mm of the circumferential surface with a slip of a cordierite material having the same composition with the extruded honeycomb structural body and containing granulated, sintered and grated cordierite of diameters of 500–700 μm, and sintered. Thus obtained honeycomb structural body has an outer diameter of 99 mm at the portion not adhered by cordierite particles, and an outer diameter of 100.2 mm at the portion adhered by the cordierite particles, as generally shown in FIG. 1b.

EXAMPLE 4

The procedures of Example 3 are repeated using the same material as in Example 3, except that cordierite particles graded to 350–500 μm are used, and the outer diameter is 99.8 mm at the cordierite particles adhered portion.

EXAMPLE 5

The cordierite material is formed by extrusion, sintered, masked at both ends, applied with a slip of cordierite material having the same composition with the extruded honeycomb structural body on the whole of a non-masked portion of a length of 50 mm of the circumferential surface, immediately sprayed and adhered with granulated and dried cordierite material of a diameter of about 250 μm, an then sintered. Thus obtained honeycomb structural body has an outer diameter of 99 mm at the cordierite particle-s non-adhered portion, and an outer diameter of 99.6 mm at the cordierite particles adhered portion, as generally shown in FIG. 1b.

EXAMPLE 6

The procedures of Example 5 are repeated using the same materials as in Example 5, except that discontinuous portions of cordierite materials are provided on the circumferential surface in the direction at a the throughholes and in the circumferential direction of right angle to the throughholes, as generally shown in FIG. 1c. The discontinuous portions are formed by masking the circumferential surface with applied paper tapes, applying a slip of the cordierite material on the whole circumferential surface, spraying particles of the cordierite material, and stripping off the paper tapes.

EXAMPLE 7

The cordierite material is formed by extrusion, sintered, masked at both ends, sprayed with a slip of the cordierite material having the same composition as that of the extruded honeycomb structural body on the whole of a non-masked portion of a length of 50 mm of the circumferential surface to a desired thickness, and then sintered. Thus obtained honeycomb structural body has an outer diameter of 99 mm at the portion not adhered by the spray-formed cordierite layer, and an outer diameter of 99.6 mm at the portion adhered by the spray-formed cordierite layer, as generally shown in FIG. 1b.

EXAMPLE 8

The procedures at a Example 7 are repeated using the same materials as in Example 7, except that discontinuous portions of cordierite materials are provided on the circumferential surface in the direction of the throughholes and in the circumferential direction of right angle to the throughholes, as generally shown in FIG. 1c. The discontinuous portions are formed in the same manner as in Example 6.

REFERENTIAL EXAMPLES 1-3

Prior commonly used cordierite honeycomb structural bodies, as shown in FIG. 2, are prepared, of which Referential Examples 1 and 2 have an outer diameter of 100 mm, and Referential Example 3 has an outer diameter of 100 mm and a partition wall thickness of 0.23 mm.

The honeycomb structural bodies of Examples 1-8 Referential Examples 1-3 are tested on their properties. The results are shown in the following Table 1.

comb structural body with an urethane tube of a thickness of about 0.5 mm, putting the sealed honeycomb structural body in a pressure vessel filled with water, gradually raising the pressure of the pressure vessel, and measuring a pressure- when a sound of breakage of the honeycomb body is heard. In the test, three samples are measured and an average value thereof is used to express a value in Table 1.

The thermal shock strength test is effected by mounting the ceramic honeycomb structure body to be tested on a framed metal net, putting the net with the mounted body in an electric furnace held at 800° C., taking it out from the electric furnace to the atmosphere after an elapse of 1 hr, and observing the appearance of the honeycomb structural body by naked eye While lightly striking the circumferential surface of the honeycomb structural body by means of a thin metallic bar. If a crack is not found by the observation by the naked eye and the striking sounds metallically, the honeycomb structure body is held in the room for 1 hr until it is cooled to room temperature, and then put in the electric furnace held at a temperature 50° C. higher than the first heating temperature. The procedures are repeated until the honeycomb structural body is broken. Breakage of the honeycomb structural body is judged when a crack is found or the striking sounds dull, and a maximum heating temperature before breakage is used to express a thermal shock strength. In the test, two samples are measured temperature thereof are used in Table 1.

The canning test is effected by wrapping a ceramic mat 5 as a cushioning member around the circumferential surface of the honeycomb structural body 1 as shown in FIG. 3a, putting it in a tapered jig having an outlet portion of an inner diameter substantially the same with an inlet portion of a steel pipe and an inlet portion of an inner diameter larger than the outlet portion, abutting the outlet portion of the jig on the inlet portion of the steel pipe and pushing the honeycomb structural body in the steel pipe by an oil pressure ram, and then pushing the honeycomb structural body out

TABLE 1

Figure 3B:
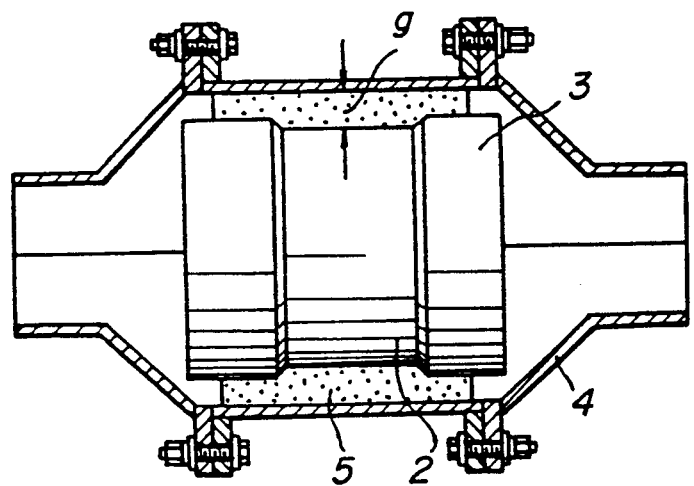
Figure 3C:
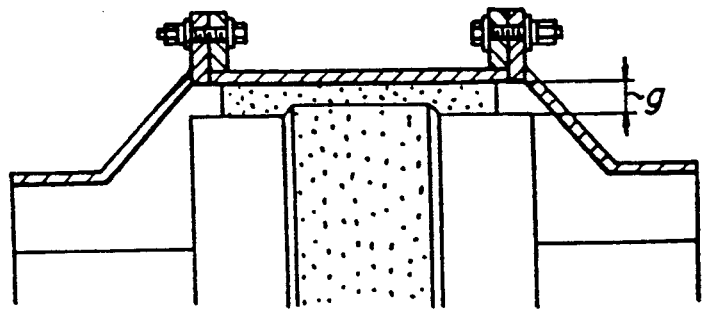
Figure 4:
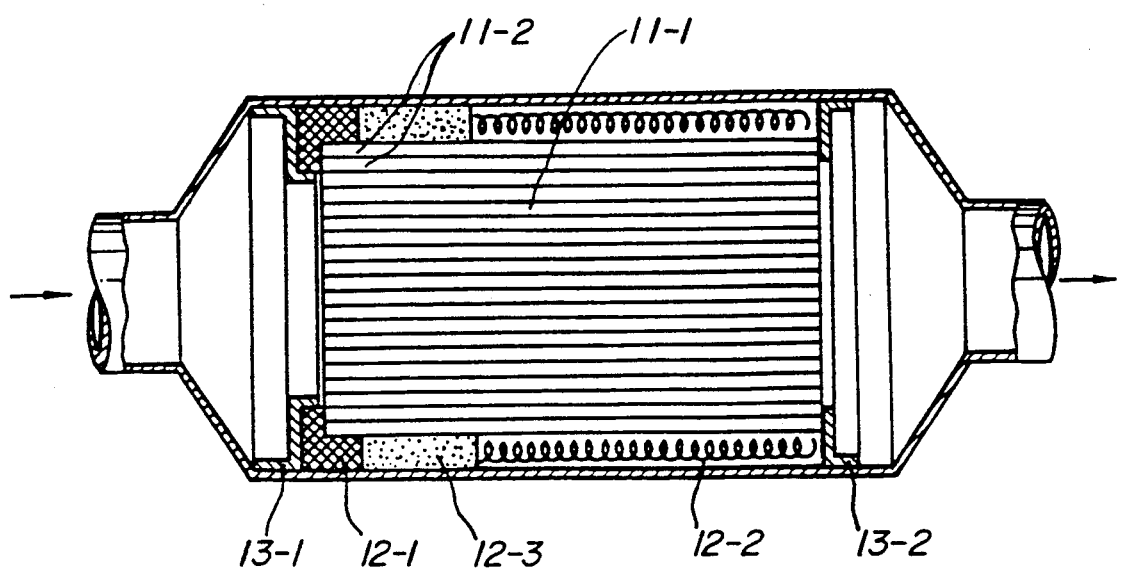
FIGS. 4 and 5 are schematic cross-sectional views respectively of an example of a prior catalytic converter.
Figure 5:
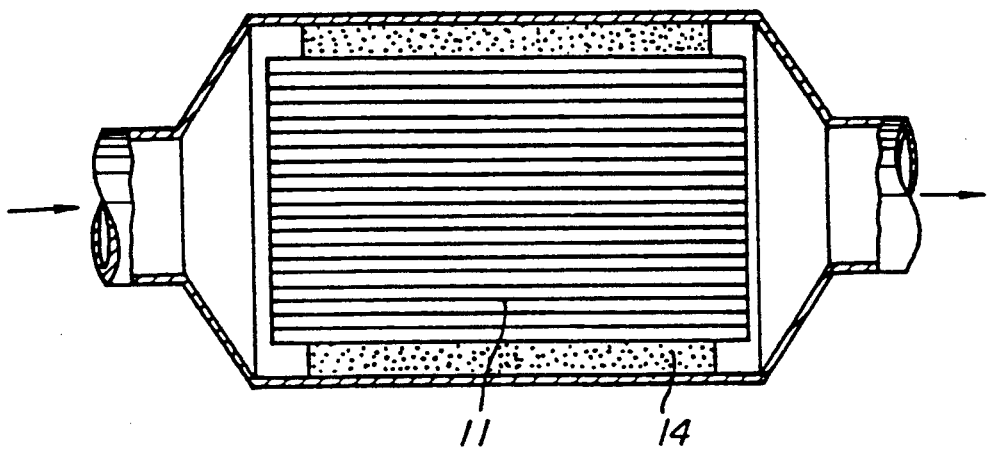

| | | Strength to external pressure (Kg/cm$^2$) | Thermal shock strength (°C.) | Breakage in canning test x yes ∘ none | Heating vibration test | | | |
|---|---|---|---|---|---|---|---|---|
| | Type | | | | Vessel | Gap *1 g (mm) | Axial displacement *2 | Rotational displacement *2 |
| Sand blasted | Example 1 | 16-19 | 900 | x | FIG. 3(b) | 3.5 | ∘ | ∘ |
| | Example 2 | 18-23 | 850 | x | FIG. 3(b) | 3.5 | x | x |
| Applied with sand | Example 3 | 28-36 *3 | 875 | x | FIG. 3(c) | 3.5 | ∘ | ∘ |
| | Example 4 | 30-39 *3 | 900 | x | FIG. 3(c) | 3.5 | ∘ | ∘ |
| | Example 5 | 27-35 *3 | 875 | ∘ | FIG. 3(c) | 3.5 | x | x |
| | Example 6 | 29-32 *3 | 900 | x | FIG. 3(c) | 3.5 | ∘ | ∘ |
| Sprayed with sand | Example 7 | 29-35 *3 | 850 | ∘ | FIG. 3(c) | 3.5 | x | x |
| | Example 8 | 28-35 *3 | 900 | ∘ | FIG. 3(c) | 3.5 | ∘ | ∘ |
| Prior commonly used | Referential Example 1 | 20-31 | 850 | x | FIG. 3(d) | 3.5 | x | x |
| | Referential Example 2 | 20-31 | 850 | x | FIG. 3(e) | 3.5 | ∘ | x |
| | Referential Example 3 | 78-96 | 875 | ∘ | FIG. 3(d) | 2.2 | ∘ | ∘ |

[Note]
*1: Gap between the vessel and the honeycomb structural body
*2: Displacement: x ... yes  ∘ ... none
*3: Strength of worked portion such as applied with sand
Strength of non-worked portion is 16-27 kg/cm$^2$ In Table 1, the tests of strength to external pressure is effected by abutting aluminum plates of a thickness of about 20 mm on the upper and the lower end surfaces of the honeycomb structural body to be tested via an urethane sheet of a thickness of about 0.5 mm, wrapping and sealing the circumferential surface of the honeyfrom the steel pipe to observe the appearance of the honeycomb structural body. The ceramic mat 5 has a thickness of 4.9 mm, and the steel pipe is prepared to have a gap g shown in FIG. 3 of 2.2 mm. In the test, two samples are tested and an average result thereof is used in Table 1.

For the heating vibration test, samples are provided by wrapping a ceramic mat 5 around the circumferential surface of the honeycomb structural body 1 as shown in FIG. 3a, pushing the wrapped honeycomb structural body in a steel pipe having welded flanges at both ends and an inner diameter which permits a gap g shown in Table 1 between the vessel and the honeycomb structural body, and attaching megaphone-shaped cones on the flanges of the steel pipe by means of bolts. FIG. 3b–3e show respectively a structure of a converter used for testing the honeycomb structural bodies.

The heating vibration test is effected by effecting 50 cycles of heating and cooling of the honeycomb body, while exerting vibrations of 200 Hz of 0–20 G on the honeycomb body, then removing the cones from the steel pipe to take out the honeycomb structural body, and observing the appearance of the honeycomb structural body. The 1 cycle of heating and cooling of the honeycomb body is composed of heating the honeycomb structural body by passing a hot gas of 800° C. coming from a propane gas burner as a heat source therethrough for 2 min, and cooling the same by passing air of room temperature therethrough for 2 min. In the test, two samples are tested and an average result thereof is used in Table 1.

As seen from the above Table 1, the strength to external pressure and the thermal shock strength of the honeycomb structural body are not damaged, even when the circumferential surface thereof is worked or processed as in the present invention, and the honeycomb structural body can withstand the heating vibration test which simulates an actual use condition with exceptions of Examples 2, 5 and 7, even when ceramic honeycomb structural bodies of relatively weak strengths of not greater than 20 kgf/cm$^2$ (strength to external pressure (minimum value)) is supported merely from the circumferential surface thereof with a low pressure. Therefore, the present invention is very effective and useful.

The present invention is not limited to the above examples, and many variations and modifications thereof are possible without departing the broad spirit and aspect of the present invention. For instance, size, shape, and surface area of the worked portion according to the present invention are not limited to those of Examples, because they are design matters determined by a type of the sealing member or the cushioning member abutting the worked portion, a width of the honeycomb body in the direction of the throughholes or a length of the throughholes, or practical use conditions.

Also, in the above embodiments, though the honeycomb structural bodies are shown to have a circular cross-section in a radial direction thereof, the honeycomb structural bodies can of course have other cross-sectional shapes, such as ellipsoidal. Moreover, though in the Examples the cells of the honeycomb structural bodies are shown square in shape, the shape of the cells is of course not limited thereto, and various shapes of the cells can be adopted. In addition, the material of the honeycomb structural bodies are not limited to cordierite used in the examples, and various materials can of course be used for the honeycomb structural bodies. Furthermore, the honeycomb structural bodies used in the Examples can have throughholes which are closed in an offset fashion at either one end surface of the honeycomb structural body.

As explained in detail in the foregoings, the present invention can easily obtain a ceramic honeycomb structural body having on at least a portion of the circumferential surface thereof a protruded or recessed portion formed by working or processing of the portion, so that a catalytic converter using the honeycomb structural body can be supported merely from the circumferential surface thereof. As a result, the vain of non-used noble metals adhered in the throughholes near the circumferential surface closed by the supporting member can be dispensed with, the volume of the catalytic converter can be minimized, and the displacement of the honeycomb structural body in the direction at a throughholes as well as in the direction of right angle to the throughholes can be prevented effectively to enhance the reliability of the catalytic converter.

Thus, the present invention is eminently useful industrially.

What is claimed is:

1. A method of forming a ceramic honeycomb structural body having at least one step protruded from at least one portion of an outer circumferential surface thereof, said method comprising:
    forming a ceramic honeycomb structural body; and
    sand blasting at least one portion of an outer circumferential surface of said honeycomb structural body to form at least one step protruded from said outer surface and extending substantially circumferentially around said outer surface.

2. The method of claim 1, wherein said at least one step extends discontinuously, circumferentially around said outer circumferential surface.

3. The method of claim 1, wherein said at least one step is formed to have a surface roughness greater than that of said outer circumferential surface of the ceramic honeycomb structural body.

4. The method of claim 1, wherein said at least one step extends circumferentially entirely around said outer circumferential surface.

5. A method of forming a ceramic honeycomb structural body having at least one step protruded from or recessed in at least one portion of an outer circumferential surface thereof, said method comprising:
    masking at least one portion of an outer circumferential surface of said honeycomb structural body; and
    applying ceramic material to the unmasked portion of said outer circumferential surface to form at least one step protruded from or recessed in said outer circumferential surface of said honeycomb structural body.

6. The method of claim 5, wherein said at least one step extends discontinuously, circumferentially around said outer circumferential surface.

7. The method of claim 5, wherein said at least one step is formed to have a surface roughness greater than that of said outer circumferential surface of the ceramic honeycomb structural body.

8. The method of claim 5, wherein said ceramic material is a ceramic slip and, after being applied to said outer circumferential surface of said honeycomb structural body, is dried and then sintered to the honeycomb structural body.

9. The method of claim 5, wherein said at least one step extends circumferentially entirely around said outer circumferential surface.

* * * * *